United States Patent [19]
Pitman et al.

[11] Patent Number: 5,486,084
[45] Date of Patent: Jan. 23, 1996

[54] MULTIPLE PURPOSE MATERIAL HANDLING AND WORKING APPARATUS

[75] Inventors: Raymond F. Pitman, 11400 Brookwood, Leawood, Kans. 66211; Richard J. Stallbaumer, Overland Park, Kans.; James A. Rusk, Kansas City, Mo.

[73] Assignee: Raymond F. Pitman, Leawood, Kans.

[21] Appl. No.: 72,914

[22] Filed: Jun. 7, 1993

[51] Int. Cl.$^6$ ........................................................ E02F 3/39
[52] U.S. Cl. ........................ 414/694; 414/728; 212/300; 188/171
[58] Field of Search .................................... 414/680, 687, 414/690, 694, 723, 718, 728, 722, 672, 664, 733; 212/188, 231, 261, 300; 37/468, 403, 347; 188/171

[56] References Cited

U.S. PATENT DOCUMENTS

| | | |
|---|---|---|
| 3,149,737 | 9/1964 | Guinot .................................. 414/694 |
| 3,235,097 | 2/1966 | Ohman . |
| 3,400,842 | 9/1968 | Owen . |
| 3,700,132 | 10/1972 | Waters . |
| 3,754,666 | 8/1973 | Suverkrop .............................. 212/188 |
| 3,819,059 | 6/1974 | Mantel . |
| 3,870,162 | 3/1975 | Nakajo . |
| 3,941,262 | 3/1976 | Moser et al. . |
| 4,044,610 | 8/1977 | Oldaeus et al. . |
| 4,077,529 | 3/1978 | Leyrat et al. . |
| 4,113,123 | 9/1978 | Jeffrey . |
| 4,122,959 | 10/1978 | Stedman . |
| 4,142,308 | 3/1979 | Brandtjen . |
| 4,154,349 | 5/1979 | Christensen . |
| 4,193,505 | 3/1980 | Satterberg et al. ..................... 212/231 |
| 4,212,582 | 7/1980 | Stecklein . |
| 4,218,837 | 8/1980 | Peterman . |
| 4,241,837 | 12/1980 | Suverkrop . |
| 4,257,731 | 3/1981 | Beaver . |
| 4,261,684 | 4/1981 | Norton et al. . |
| 4,272,222 | 6/1981 | Davis . |
| 4,293,269 | 10/1981 | Zook . |
| 4,318,663 | 3/1982 | Waite . |
| 4,355,477 | 10/1982 | Holmgren et al. . |
| 4,378,193 | 3/1983 | Schaeff . |
| 4,389,153 | 6/1983 | Pedersen et al. . |
| 4,393,607 | 7/1983 | Hirosawa . |
| 4,400,994 | 8/1983 | Skjaeveland . |
| 4,436,477 | 3/1984 | Lenertz et al. . |
| 4,493,426 | 1/1985 | Sterner . |
| 4,561,552 | 12/1985 | Sterner . |
| 4,571,146 | 2/1986 | Eriksson . |
| 4,571,147 | 2/1986 | Schaeff . |
| 4,573,592 | 3/1986 | Oliphant . |
| 4,592,696 | 6/1986 | Carternock . |
| 4,601,626 | 7/1986 | Heine et al. . |
| 4,609,322 | 9/1986 | Quant . |
| 4,621,742 | 11/1986 | Rathi . |
| 4,632,595 | 12/1986 | Schaeff . |
| 4,639,183 | 1/1987 | Güthoff . |
| 4,650,393 | 3/1987 | Denda . |
| 4,653,655 | 3/1987 | Rathi et al. . |
| 4,658,970 | 4/1987 | Oliphant . |
| 4,660,729 | 4/1987 | Carbert . |
| 4,686,782 | 8/1987 | Nagatomo . |
| 4,693,662 | 9/1987 | Haringer . |
| 4,775,029 | 10/1988 | MacDonald et al. . |

(List continued on next page.)

*Primary Examiner*—Donald W. Underwood
*Attorney, Agent, or Firm*—Hovey, Williams, Timmons & Collins

[57] ABSTRACT

A mobile vehicle is provided with a multiple purpose material handling and working apparatus including a boom, and a tool supporting boom extension supported on the free distal end of the boom for rotation about an axis parallel to the longitudinal axis of the boom. The boom extension includes a body, a linkage structure movable between unpivoted and pivoted positions relative to the body, a coupling, and a linkage drive assembly mounted on and movable with the body for driving the linkage structure between unpivoted and pivoted positions. A rotary drive motor is supported on the boom for rotating the boom extension relative to the boom.

11 Claims, 9 Drawing Sheets

U.S. PATENT DOCUMENTS

| | | |
|---|---|---|
| 4,791,737 | 12/1988 | Morelli . |
| 4,810,162 | 3/1989 | Foster . |
| 4,828,125 | 5/1989 | Svedaker . |
| 4,854,813 | 8/1989 | Degeeter et al. . |
| 4,854,814 | 8/1989 | Smith et al. . |
| 4,859,138 | 8/1989 | Brocklebank et al. . |
| 4,871,292 | 10/1989 | Milanowski . |
| 4,881,867 | 11/1989 | Essex et al. . |
| 4,889,466 | 12/1989 | Jindai et al. . |
| 4,895,263 | 1/1990 | Saint Gerand . |
| 4,906,161 | 3/1990 | Weyer . |
| 4,947,705 | 8/1990 | Yates et al. . |
| 4,950,127 | 8/1990 | Weyer . |
| 4,952,116 | 8/1990 | Weyer . |
| 4,958,981 | 9/1990 | Uchihashi . |
| 5,011,364 | 4/1991 | Anderson ............................ 188/171 X |
| 5,016,767 | 5/1991 | Thibault . |
| 5,054,990 | 10/1991 | Schaeff . |
| 5,125,788 | 6/1992 | Stenger . |
| 5,267,824 | 12/1993 | Kishi ....................................... 414/694 |

MULTIPLE PURPOSE MATERIAL HANDLING AND WORKING APPARATUS

BACKGROUND OF THE INVENTION

1. Field of the Invention

The present invention relates generally to earth working devices and, more particularly, to a mobile vehicle provided with a multiple purpose material handling and working apparatus for use with a plurality of different tools in performing construction tasks, utility installation, repair and/or replacement operations.

2. Discussion of the Prior Art

Utility companies are charged with the obligation of maintaining and upgrading power distribution networks such as gas, water, electric and communication lines between utility suppliers and end users. Many such networks are installed underground, requiring excavation to expose the lines to maintenance personnel for repair. Similarly, difficulties have been encountered in connection with the construction of new service where the available working envelope is restricted.

For example, in order to repair a leaking or worn out gas supply line, it is conventional to perform a number of different operations. Initially, it may be necessary to saw through a concrete street or sidewalk, or to otherwise demolish any concrete surface above the line to be repaired. Thereafter, a backhoe is used to excavate the earth down to the line. This excavation must normally be large enough to accommodate the number of maintenance personnel needed to make the repair.

During any given repair, any of a number of different tools may be used, some of which are driven pneumatically, and others of which are electrically or hydraulically operated. Thus, it is often necessary to provide a compressor, generator, hydraulic pump and/or arc welder at the work site.

Once a repair has been made, the backhoe is brought in to backfill the excavation, and a compactor such as a jackhammer with a flat-bottomed tip is used to compact the soil before replacement of the concrete.

Thus, it is necessary under known circumstances to provide a number of different independently driven tools at a site in order to permit repair of a gas line or the like, such that a large amount of space is required when little is available.

In like manner, new utility line or service construction, installation of communication lines, or various construction projects generally, often requires that a number of separate utility or construction vehicles or equipment be made available at the construction site, thus presenting logistic problems, increasing the cost of the job because of multiple equipment requirements and the necessity of providing a number of different personnel for operating the equipment in use.

OBJECTS AND SUMMARY OF THE INVENTION

It is an object of the present invention to provide a mobile vehicle with a multiple purpose apparatus which obviates the need for a plurality of independently operated or driven tools or material handling components by reducing the amount of equipment which must be brought to a site in order to carry out typical construction work or utility installation and repairs. By providing such a device, less space is required at the work site, and construction and repairs may be conveniently made, even within a single lane of a roadway or other restricted access area.

Another object of the present invention is to provide an apparatus having a swingable, extensible boom assembly which may be fitted with an excavation bucket and manipulated to permit excavation on either side of and in close proximity to the vehicle, and to the rear of the apparatus, thus improving the versatility of the boom.

The apparatus of the present invention includes a manipulator for operating a bucket or other tool for handling material not only in new construction, but also in connection with repair and maintenance operations as well. The manipulator is compact and presents a low profile for tools such as a bucket to permit excavation of deep, small perimeter holes closely adjacent the vehicle.

Further, by allowing rotation of the manipulator relative to the boom, it is possible to attach a penetrating device, compacting device, material handling arm, winch or scoop to the manipulator and to manipulate these tools for movement in any plane relative to the apparatus while they are supported by the boom.

It is another object of the present invention to provide a coupling for the manipulator which permits quick connection and disconnection of various tools to and from the boom.

In accordance with these and other objects evident from the following description of a preferred embodiment of the invention, a mobile vehicle is provided with a multiple purpose material handling and working apparatus including a boom, and a tool supporting boom extension supported on the free distal end of the boom by a bearing assembly that permits the boom extension to rotate about an axis parallel to the longitudinal axis of the boom. The boom extension includes a body, a linkage structure movable between unpivoted and pivoted positions relative to the body, a coupling means for coupling each of the one or more tools to the linkage structure, and a linkage drive means mounted on and movable with the body for driving the linkage structure between unpivoted and pivoted positions. A rotary drive means is supported on the boom for rotating the boom extension relative to the boom, and a brake means may be provided for braking rotational movement of the boom extension relative to the boom when the rotary drive means is not operating.

Preferably, the linkage drive means includes a cylinder-and-piston assembly, wherein the cylinder serves as a shaft on which the boom extension is mounted for rotation relative to the outer boom. Also, a coupling is provided for allowing quick connect and disconnect of various tools in order to permit several different repair/replacement operations to be conducted.

By providing an apparatus in accordance with the present invention, numerous advantages are achieved. For example, by providing a single apparatus having means for storing, supporting and driving all of the various tools needed to carry out construction projects or maintain or repair utility services, the amount of equipment required at the site is substantially reduced. In addition, because fewer machines are present, fewer maintenance personnel are required to conduct the work task.

BRIEF DESCRIPTION OF THE DRAWINGS FIGURES

A preferred embodiment of the present invention is described in detail below with reference to the attached drawing figures, wherein.

DETAILED DESCRIPTION OF THE PREFERRED EMBODIMENT

Figure 1:
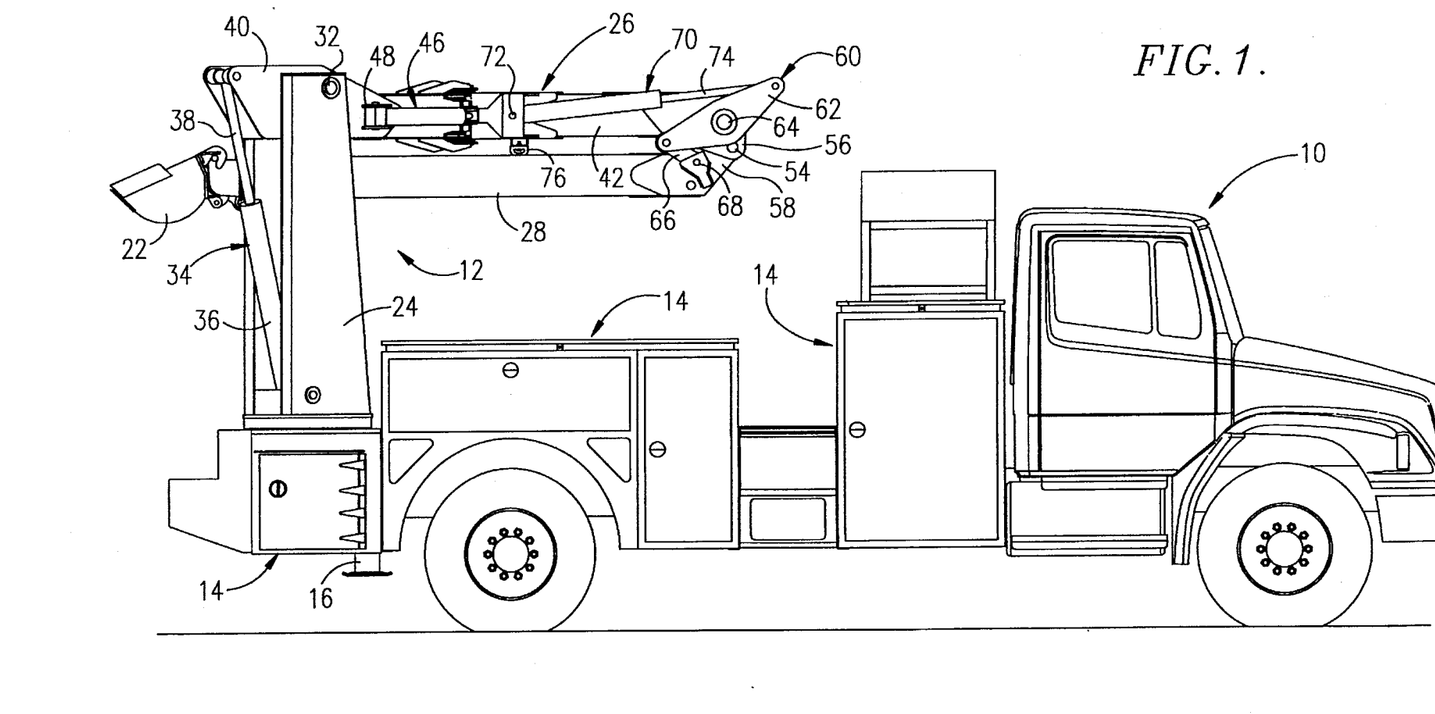
FIG. 1 is a side elevational view of a truck-mounted material handling and working apparatus constructed in accordance with the preferred embodiment.

A truck-mounted multiple purpose material handling and working apparatus constructed in accordance with a preferred embodiment of the present invention is illustrated in FIG. 1, and includes a truck 10, a boom assembly 12 supported on the truck, numerous storage compartments 14, and a pair of outriggers 16 for stabilizing the truck during use of the boom assembly.

Figure 2:
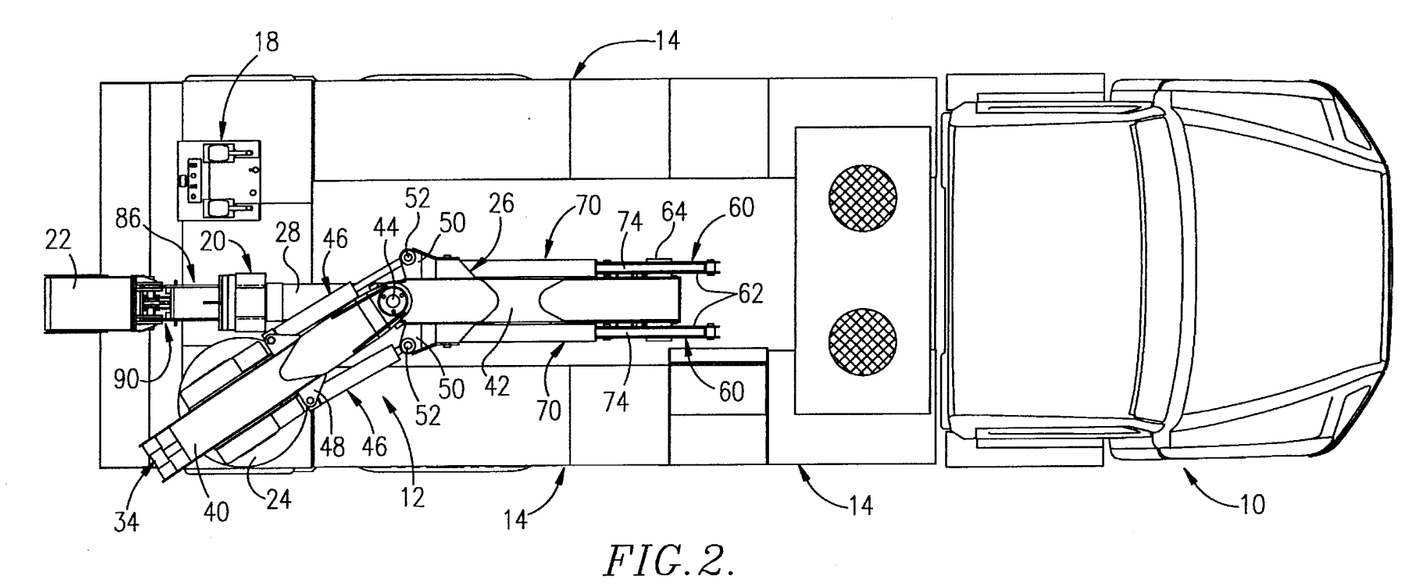
FIG. 2 is a top plan view of the apparatus.

As shown in FIG. 2, the apparatus also includes a control station 18 which may be rotated about a vertical axis to allow the operator to face in any one of a number desired direction when operating the apparatus. A manipulator 20 is supported on the boom assembly for manipulating an excavation bucket 22 or other tool.

The truck 10 is powered by a conventional diesel or gasoline powered engine, and includes two power take-offs. One of these power take-offs drives an air compressor which may be used to supply compressed air for various pneumatic tools used to carry out construction, maintenance or repair operations. The other power take-off drives a multiple hydraulic pump unit which operates a generator having both 110 and 220 V capabilities, for powering an arc welder and other electrically powered tools, and which provides hydraulic power to the outriggers, boom assembly, manipulator, and other hydraulically driven tools.

The storage compartments 14 provided on the truck, shown in both FIGS. 1 and 2, allow personnel to stow on the truck all of the different tools necessary for a particular task without needing to employ additional trucks, trailers or equipment for getting the equipment to the job site and operating it. Among the tools capable of being carried on the truck are a hydraulic saw, hydraulic demolition tool, hydraulic soil compacting tool, excavation bucket, arc welder, drilling and threading tools and other conventional equipment used in construction, maintenance and repair work.

Figure 3:
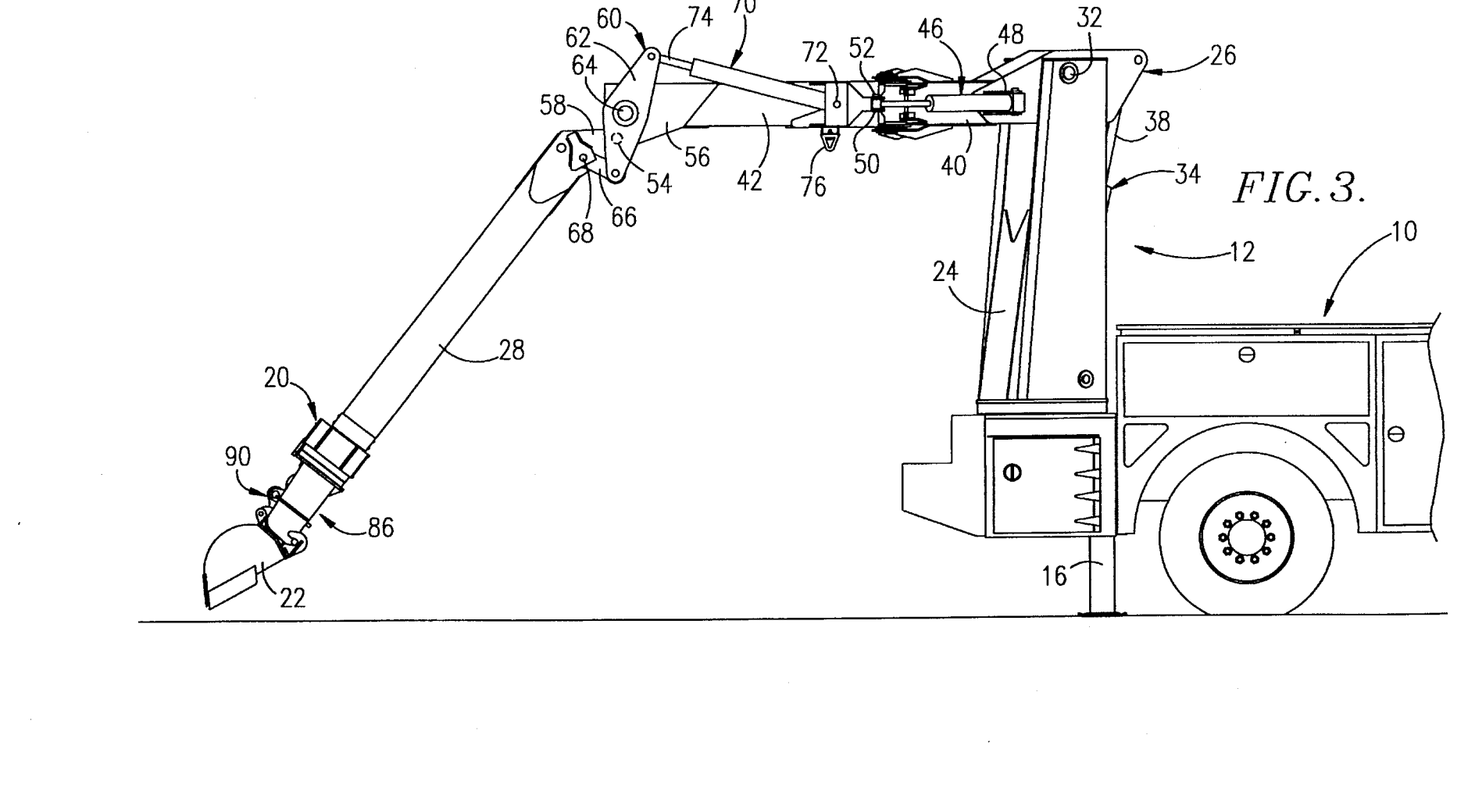
FIG. 3 is a fragmentary side elevational view of the apparatus, illustrating a boom assembly of the apparatus in a partially articulated position.

The boom assembly 12 is illustrated in FIG. 3, and broadly includes a turret 24, a base boom 26, an intermediate boom 28, an outer boom 30, and the manipulator 20. The turret 24 is an upstanding tower that is supported on the truck for rotational movement about the vertical longitudinal axis of the turret, and movement of the turret is controlled at the control station 18. A rotary drive means is provided for carrying out rotation of the turret, and includes a hydraulic motor having a rotatable output shaft, and a suitable coupling and associated brake between the output shaft and the turret.

The base boom 26 is supported on the turret for pivotal movement relative to the turret about a horizontal axis defined by a connecting pin 32 extending through the turret and base boom. As shown in FIG. 1, a cylinder-and-piston assembly 34 is provided between the turret and base boom for pivoting the base boom. The assembly 34 includes a cylinder 36 supported for pivotal movement about a horizontal axis at the bottom of the turret, and a piston having a rod 38 extending from the cylinder to a horizontal pivot axis provided on the base boom.

The base boom 26 includes two sections 40, 42, one proximal to the turret and one distal thereto. As illustrated in FIG. 3, the proximal section 40 is supported on the turret 24 by the pin 32 and pivots about the pin, while the distal section 42, shown in FIG. 2, is supported on the proximal section 40 for pivotal movement relative to the proximal section about a vertical axis defined by pin 44.

A hydraulic piston-and-cylinder assembly 46 is supported on each side of the proximal section 40 between a pair of vertically spaced lugs 48, and is pivotal about a vertical axis in order to accommodate swinging movement of the distal section 42. These assemblies 46 are also connected to laterally extending ears 50 on the distal section by vertically oriented pins 52 which permit pivotal movement of the piston-and-cylinder assemblies relative to the distal section.

Figure 5:
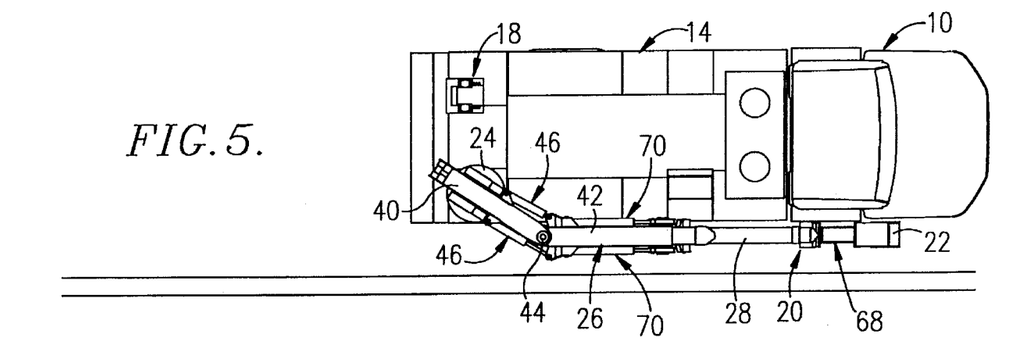
FIG. 5 is a schematic top plan view of the apparatus, illustrating the boom assembly in a first operative position.
Figure 6:
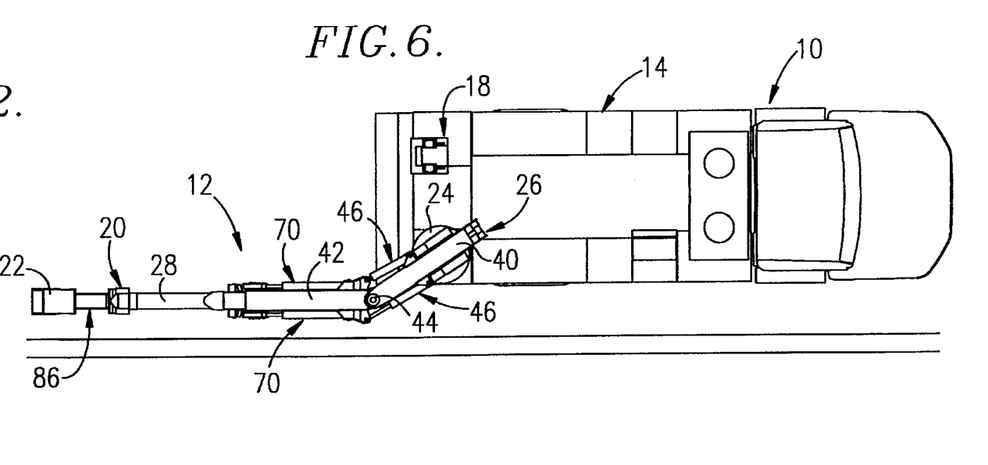
FIG. 6 is a schematic top plan view of the apparatus, illustrating the boom assembly in a second operative position.

During operation of the boom, if the operator wants to pivot the distal section 42 of the base boom relative to the proximal section 40 in order to position the tool to the side of the truck as illustrated in either of FIGS. 5 or 6, the piston-and-cylinder assemblies 46 are actuated, one in a direction opposite to the other, to effect the pivoting or swinging movement. Thereafter, hydraulic pressure within the assemblies is maintained to hold the desired position of the base boom sections while the remainder of the booms are moved to operate the tool.

As shown in FIG. 3, the intermediate boom 28 is attached to the distal section 42 of the base boom 26 for pivotal movement relative to the base boom about a horizontal axis defined by a pin 54 extending through the base and intermediate booms. Preferably, as illustrated in FIG. 8, each boom 26, 28 includes a pair of laterally spaced depending wall sections 56, 58 extending beneath the bottom walls of the booms.

Figures 7, 8, 9, 10, 11, 12:
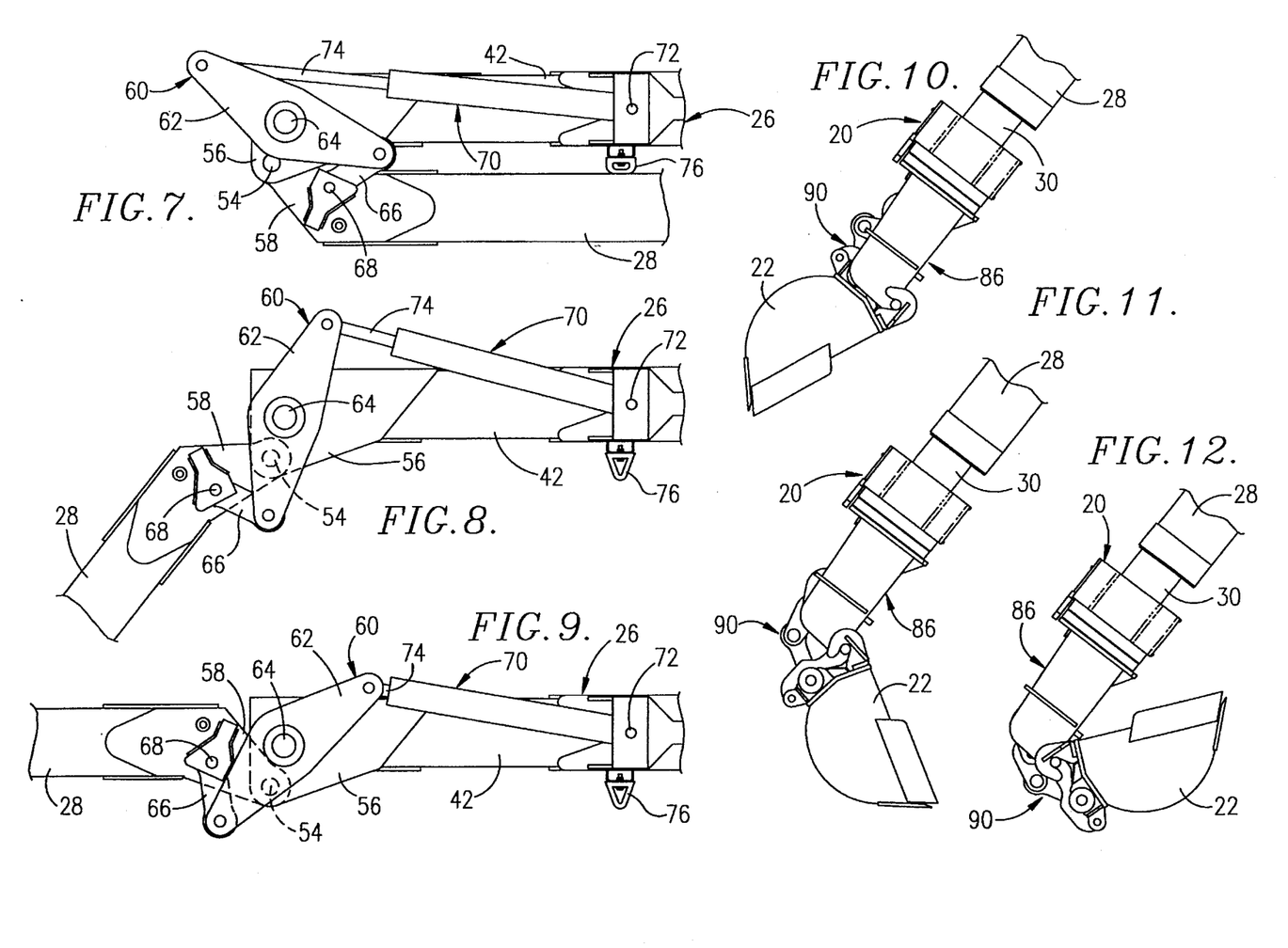
FIG. 7 is a fragmentary side elevational view of the boom assembly, illustrating an intermediate boom in a storage position.
FIG. 8 is a fragmentary side elevational view of the boom assembly, illustrating the intermediate boom in a partially articulated position.
FIG. 9 is a fragmentary side elevational view of the boom assembly, illustrating the intermediate boom in a fully articulated position.
FIG. 10 is a fragmentary side elevational view of a manipulator that is supported on the boom assembly, illustrating an excavation bucket in a nonpivoted position.
FIG. 11 is a fragmentary side elevational view of the manipulator, illustrating the excavation bucket in a partially pivoted position.
FIG. 12 is a fragmentary side elevational view of the manipulator, illustrating the excavation bucket in a fully pivoted position.

By providing this construction, the intermediate boom 28 is movable between a storage position, shown in FIG. 7, nesting against and parallel to the base boom for storage and transportation of the apparatus, a second position substantially collinear with and extending outward from the base boom, shown in FIG. 9, and any desired intermediate position, one of which is illustrated in FIG. 8.

A linkage structure is connected between the base boom 26 and the intermediate boom 28 for carrying out pivotal movement of the intermediate boom, and a hydraulic drive means is provided for driving the linkage structure. Preferably, the linkage structure is mounted externally of the booms, and includes two laterally spaced pairs of links 60 connected between the base and intermediate booms. The link pairs are similar to one another and are supported on opposite lateral side walls of the booms.

The first, driving link 62 of each pair is supported on the base boom 26 for pivotal movement about a horizontal axis defined by a cross pin 64 extending laterally from each side wall of the base boom above and in a direction parallel to the pivot axis of the intermediate boom. The cross pin 64 is centrally located on the driving link 62, and the link is also connected at one end thereof for pivotal movement relative to the second link 66 while the opposite end is connected for pivotal movement relative to the drive means.

The second, driven link 66 of each link pair 60, in addition to being supported for pivotal movement on the first link 62, is also supported for pivotal movement on the intermediate boom 28 by a transverse pin 68 extending laterally outward from the intermediate boom. The drive means preferably includes a piston-and-cylinder assembly 70 associated with each link pair 60. Each assembly 70 is supported on one lateral side of the distal base boom section 42 for pivotal movement about a horizonal axis defined by a mounting pin 72.

In the first, storage position of the intermediate boom, as shown in FIG. 7, the pistons 74 of the assemblies 70 are fully extended so that the first links 62 are turned in a counterclockwise direction, working through the second links 66 to pull the intermediate boom against the base boom 26. A resilient rubber bumper 76 is mounted on the bottom wall of the base boom and defines a stop against which the intermediate boom rests.

Turning to FIG. 8, as the pistons 74 of the assemblies 70 are withdrawn into the cylinders, the first links 62 pivot in a clockwise direction, causing the second links 66 to push the intermediate boom 28 out from under the base boom toward the fully articulated position, as shown in FIG. 9, in which the intermediate boom is substantially collinear with the base boom.

Although the assemblies 70 are illustrated as being mounted on the base boom 26, it is noted that the linkage structure and drive means could be reversed relative to the booms 26, 28 so that the assemblies are supported on the intermediate boom, and operate through the drive links, also supported on the intermediate boom, to drive the driven links that are connected to the base boom. This reversal of the structure still provides the advantage of a system that is completely external to the intermediate boom so that the outer boom 30 may be received within the intermediate boom as described below.

A counterbalance valve or the like is provided in the hydraulic circuit including the cylinder assemblies 70, serving as a fuse for limiting the load carried by the boom assembly. These valves relieve pressure in the assemblies 70 above a preset maximum pressure.

It is of importance that the cross pins 64 for the driving links 62, the overall length of each of the links 62, the positioning of the driven links 66 and the connection of those links 66 to the intermediate boom 28 through pins 68, are interrelated in a manner such that as the bucket 22 is rotated through an arc to perform a digging operation during articulation of boom 28, at no point during that arc of movement of the bucket 22 does the induced pressure imposed on the cylinder assemblies 70 exceed a pre-established value, thus offering self-adjusting overload protection for the components.

Figure 4:
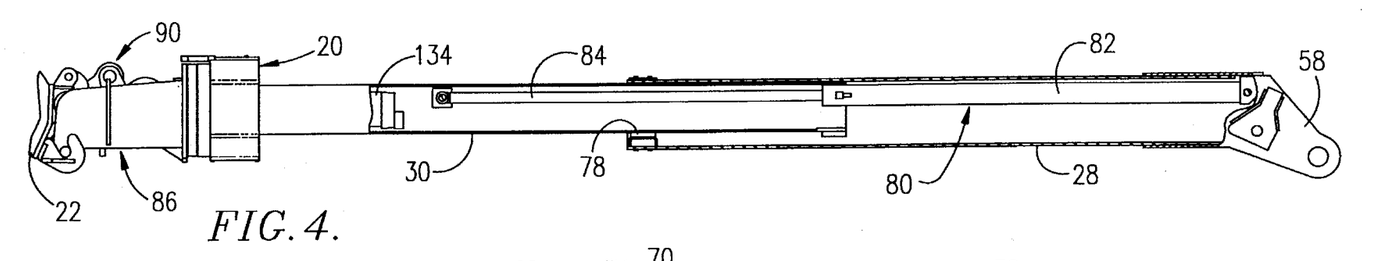
FIG. 4 is a fragmentary side sectional view of the boom assembly, illustrating intermediate and outer booms in a partially extended position.
Figures 13, 14, 16:
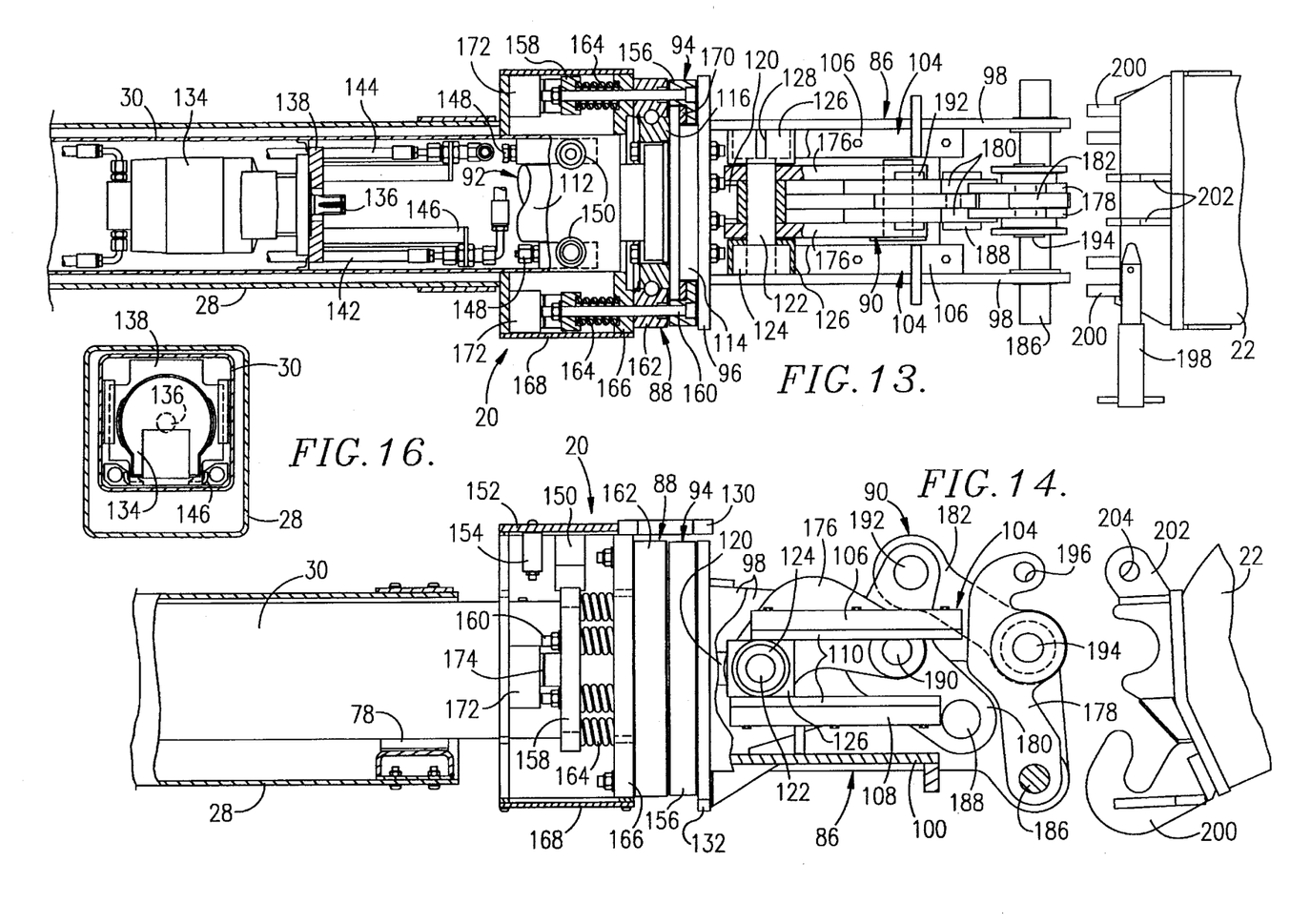
FIG. 13 is a fragmentary top plan view, partially in section, of the manipulator.
FIG. 14 is a fragmentary side elevational view, partially in section, of the manipulator, illustrating a coupling used to connect tools to the apparatus.
FIG. 16 is a sectional view taken along line 16—16 of FIG. 15.

As shown in FIG. 4, the outer boom 30 is telescopically supported within the intermediate boom 28 and is extensible between retracted and extended positions relative to the intermediate boom. The interior of the intermediate boom is hollow and substantially empty, and defines a receptacle within which the outer boom is received. As shown in FIG. 14, wear pads 78 are mounted inside the intermediate boom to support the outer boom for axial sliding movement. The height of the intermediate boom is greater than the height of the outer boom by a distance sufficient to provide room for enough hydraulic line to enable the outer boom to be extended completely relative to the inner boom and still supplied with hydraulic fluid.

A cylinder-and-piston assembly 80 is supported between the intermediate and outer booms, and includes a cylinder 82 attached to the intermediate boom and a piston having a rod 84 extending from the cylinder and connected to the outer boom. When the rod is retracted, the outer boom is pulled to the position shown in FIG. 3, relative to the intermediate boom. When extended, the rod 84 moves the outer boom to the extended position shown in FIG. 4.

Figure 15:
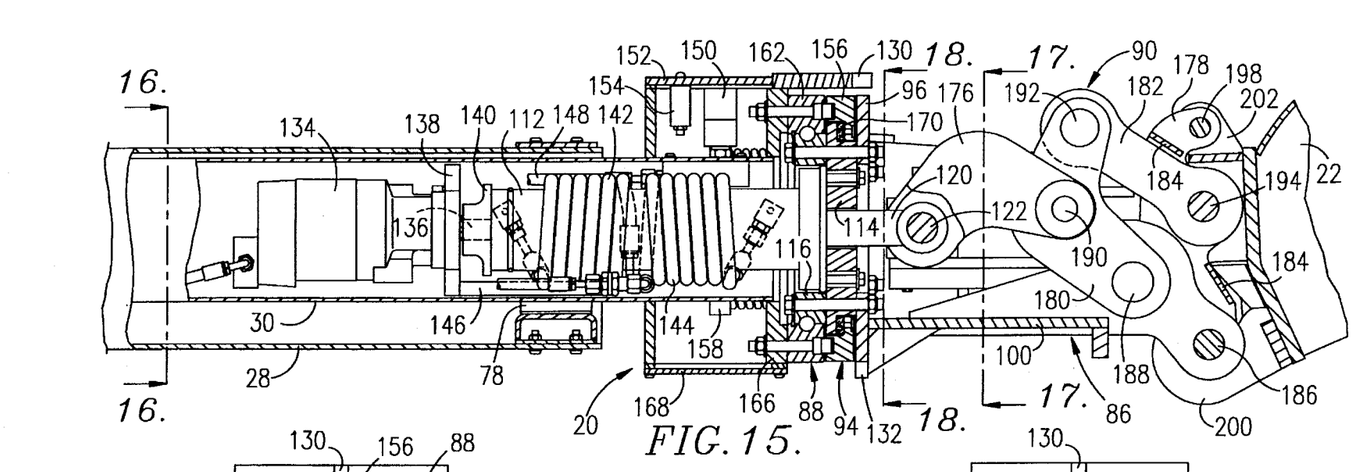
FIG. 15 is a fragmentary side elevational view of the manipulator, illustrating the tool coupled to the apparatus.

As illustrated in FIG. 15, the manipulator 20 is located at the free end of the outer boom, and broadly includes a boom extension 86 supported on the free distal end of the boom 30 by a bearing assembly 88 that permits the boom extension to rotate about an axis collinear with the longitudinal axis of the outer boom, and a rotary drive means supported on the outer boom for rotating the extension.

A linkage structure 90 is supported on the boom extension, and a cylinder-and-piston assembly 92 is provided for driving the linkage structure between unpivoted and pivoted positions. As shown in FIG. 14, a coupling is provided on the structure 90 for permitting attachment of the extension to a tool, such as the bucket 22. There is a brake assembly 94 provided between the outer boom 30 and the boom extension 86, best shown in FIG. 13, for braking rotational movement of the boom extension relative to the outer boom, and the rotary drive means releases the brake when rotating the boom extension.

Figure 17:
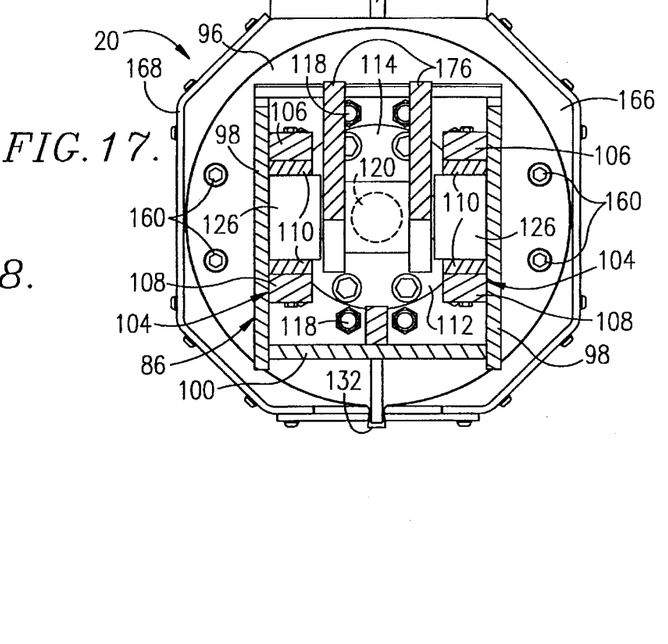
FIG. 17 is a sectional view taken along line 17—17 of FIG. 15.
Figure 18:
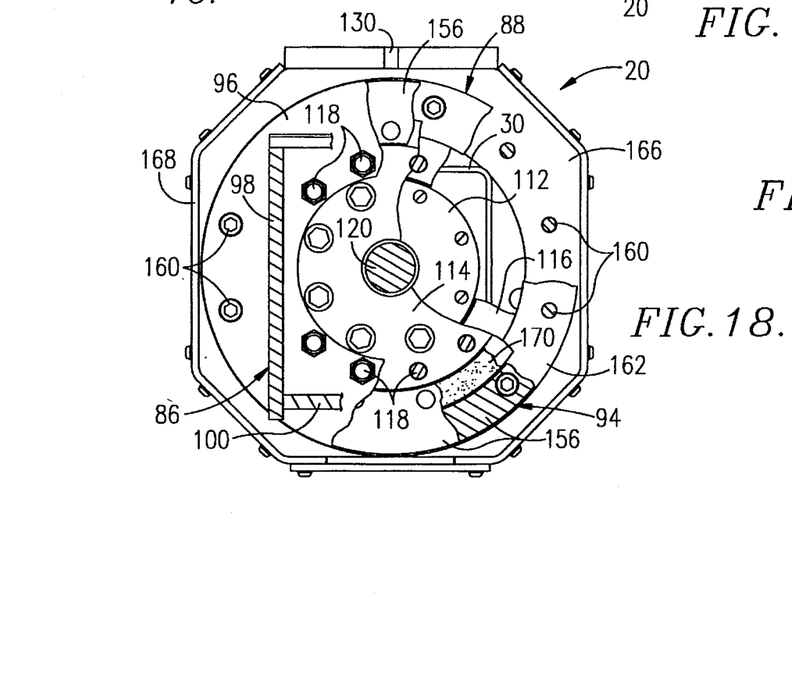
FIG. 18 is a sectional view taken along line 18—18 of FIG. 15.

The boom extension 86 is illustrated in FIG. 17, and includes a body defined by an annular end plate 96, a pair of side walls 98 welded to the end plate, a bottom wall 100 extending between the side walls. A pair of opposed, longitudinally extending ways 104 are provided on the inner surfaces of the side walls 98. Each of these ways 104 includes upper and lower tracks 106, 108 which are spaced vertically from one another and staggered slightly in the longitudinal direction of the body, with the upper tracks 106 extending slightly forward of the lower tracks 108 toward the distal end of the extension. A wear surface 110 is secured to each track and opposes the wear surface on the mating track to define a travel path between the tracks in the longitudinal direction of the extension.

The cylinder-and-piston assembly 92 is shown in FIG. 15, and includes a cylinder 112 that is retained on the body of the extension 86 by a plate 114 that is sandwiched between the end plate 96 of the body and an inner race 116 of the bearing assembly 88. These three components 96, 114, 116 are secured together by a plurality of bolts 118 and rotate together during rotation of the boom extension. The assembly 92 also includes a piston having a rod 120 extending from the cylinder 112 through central openings in the plates 96, 114. The rod 120 terminates at a transverse shaft 122 which is connected for movement with the rod during actuation of the cylinder-and-piston assembly 92.

The transverse shaft 122 supports a pair of opposed rollers 124 sized for receipt within the ways 104. Each roller 124 includes a diameter slightly smaller than the distance between the tracks 106, 108 of the ways so that as the cylinder-and-piston assembly 92 is actuated, the rollers 12.4 travel along the ways 104 maintaining the rod 120 collinear with the cylinder 112 and preventing transverse forces from being transmitted to the assembly by the linkage structure.

Each roller 124 is supported within a block 126 that is sized for receipt within the ways. The blocks surround the rollers except for small slits 128 formed in the top and bottom surfaces of the blocks, through which the rollers engage the wear surfaces of the ways. These blocks clear debris from the ways during movement of the rollers back and forth along the body.

The entire boom extension 86 rotates with the inner race 116 of the bearing assembly relative to the outer boom 30. As illustrated in FIG. 15, a limit stop 130 is mounted at the distal end of the outer boom, and an upstanding tab 132 is fixed to the end plate of the extension for engaging the limit stop to prevent rotation of the extension by more than about 355° in either direction. Thus, the extension is rotatable through a rotational range of movement of less than about one revolution.

Turning to FIG. 13, the rotary drive means is provided on the outer boom for rotating the extension, and includes a hydraulic motor 134 having a splined rotatable output shaft 136. The motor is mounted on a support plate 138 that is restrained against rotation and axial movement within the outer boom, and the output shaft extends through an opening in the plate. Preferably, an adjustable high torque, low speed hydraulic motor is employed which rotates the extension at a speed of about 4–10 rpm.

The output shaft 136 of the motor is sized for sliding receipt within a mating hole in an end plate 140 of the cylinder 112 to aid in assembly of the apparatus, and is operable to rotate the cylinder; this rotation being transmitted through the plates 96, 114 to the boom extension in order to rotate the boom extension relative to the outer boom. Returning to FIG. 15, hydraulic fluid supply lines 142, 144 wrapped in opposite directions, extend between a source of hydraulic fluid and each end of the cylinder 112. These lines 142, 144 are wrapped around the cylinder several times so that when the cylinder is rotated to a first position in which the tab 132 engages the stop 130, the lines are wrapped tight around the cylinder, and when the cylinder is rotated away from the first position, the lines 142, 144 loosen.

A stand-off 146 is supported by the support plate 138 within the outer boom 30, and supports the hydraulic lines 142, 144. The lines are fastened to the stand-off by couplings that secure the lines to the outer boom to prevent entanglement of the lines during rotation of the boom extension 86.

Figure 22:
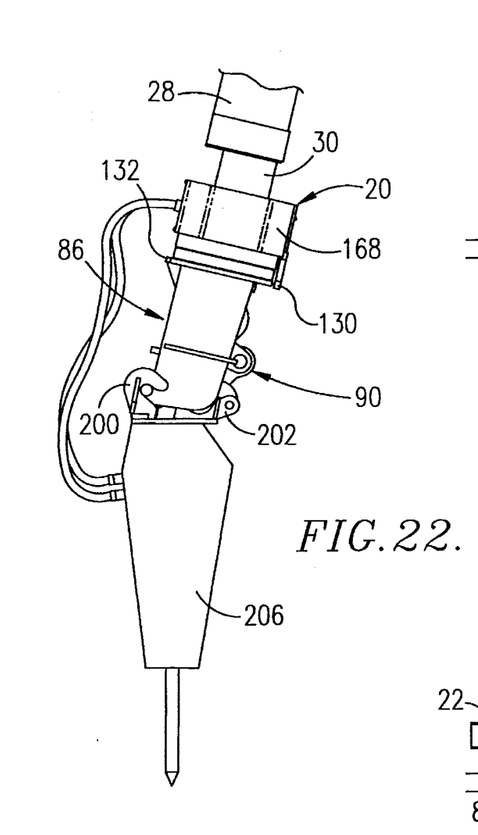
FIG. 22 is a fragmentary perspective view of the manipulator, illustrating an alternate tool coupled to the apparatus.

Tap lines 148 are provided on the outer boom along with suitable couplings 150 for enabling hydraulic tools supported on the extension to be connected to the source of hydraulic fluid. Preferably, a cover 152 normally protects these couplings 150 from exposure to debris, and may be removed to permit attachment of the lines to a tool, such as a hammer tool as shown in FIG. 22. A latch 154 is provided for securing the cover in place.

The brake assembly 94 is shown in FIG. 13, and includes an annular shoe 156 and a bearing plate 158 connected to the shoe by a plurality of bolts 160 extending through an outer race 162 of the bearing assembly 88. Eight compression springs 164 are provided between the bearing plate and end plate 166 of the outer boom 30 to bias the bearing plate away from the shoe and for pulling the shoe against the plate 114 to brake rotational movement of the extension 86. These springs 164 are housed within an outer casing 168 provided on the distal end of the outer boom which remains with the outer boom during rotation of the extension.

The brake shoe 156 includes an annular pad 170 riveted to the shoe, which contacts the plate 114 to prevent wear of the plate and shoe surfaces. Preferably, the springs 164 are designed to exert a braking force on the extension sufficient to withstand 28,000 inch-lbs. torque (28 kips), or enough to allow the manipulator to support a 4000 lb. load during operation. If it is desired to limit the actual upper limit of the load to be carried by the boom assembly, a bypass is provided in the hydraulic circuit, in the form of a counterbalance valve or the like, to relieve excess pressure in the drive cylinders and prevent high loads from damaging the apparatus.

A hydraulic actuator 172 is provided on each side of the outer boom adjacent the bearing plate 158, and includes a plunger 174 that engages the bearing plate. These actuators have a stroke of about ½ inch, and function to push the bearing plate toward the shoe against the bias of the springs in order to release the grip of the brake on the boom extension. The control system for the apparatus includes means for operating the hydraulic actuators any time the hydraulic motor is operated so that the brake is released during driven rotation of the boom extension.

Figures 19, 20, 21:
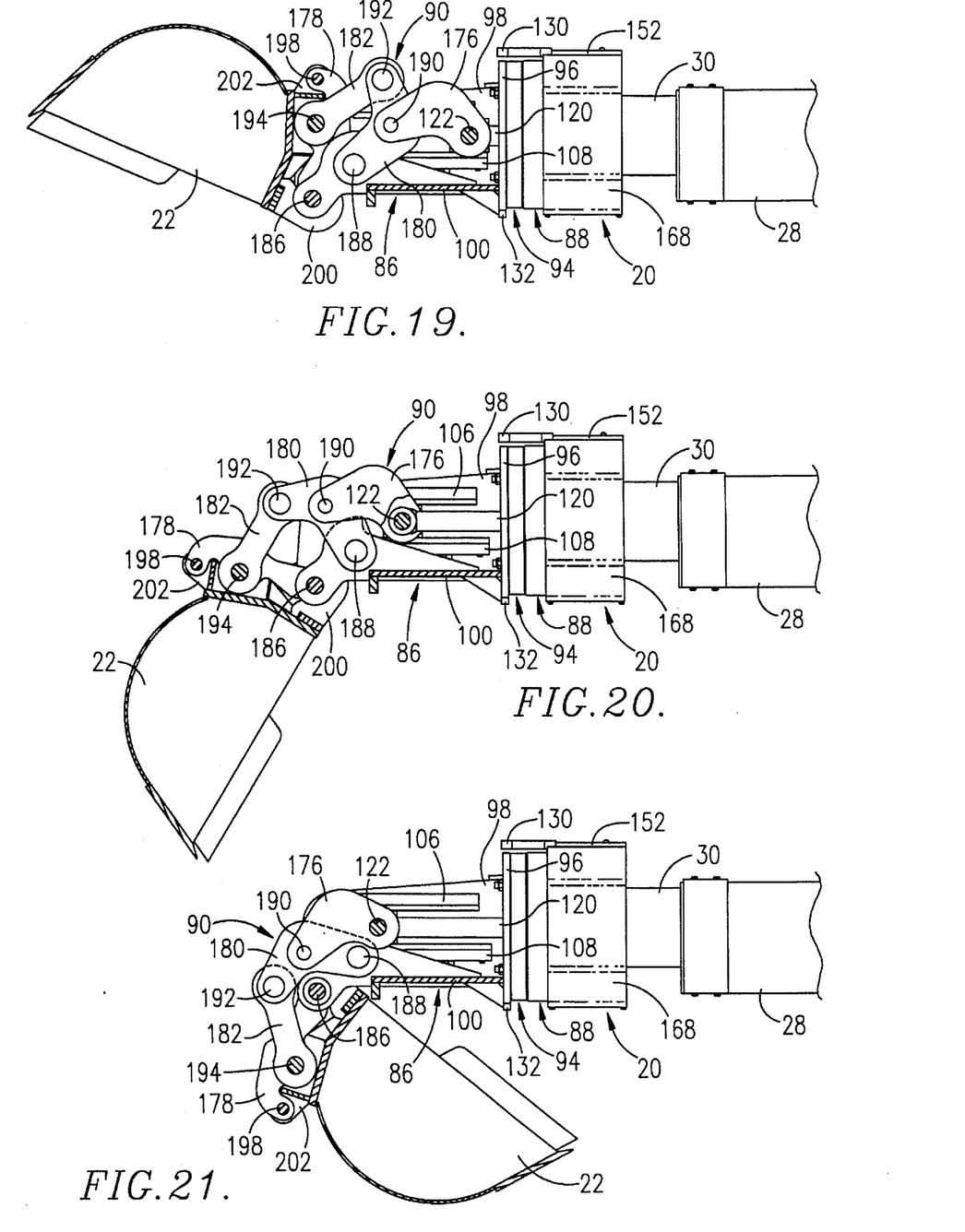
FIG. 19 is a side elevational view, taken in section, of the manipulator, illustrating the assembly in a nonpivoted position.
FIG. 20 is a side elevational view, taken in section, of the manipulator, illustrating the assembly in a partially pivoted position.
FIG. 21 is a side elevational view, taken in section, of the manipulator, illustrating the assembly in a fully pivoted position.

The linkage structure 90 is illustrated in various positions in FIGS. 19–21, and is a four bar linkage and a slider crank which is attached to the rod 120 and used to drive the four bar linkage. The four bar linkage includes a pivoting driven link 178 and two intermediate links 180, 182 connecting the driven link to a sliding drive link 176. As shown in FIG. 20, the drive link is supported for axial movement with the rod 120 and for pivotal movement on the transverse shaft.

The drive link preferably includes a pair of laterally spaced link plates secured together by cross pieces extending between the plates. The driven link is also formed by a pair of spaced plates which are connected together by cross pieces 184, shown in FIG. 15, and move together as a single link. The link 178 is supported for pivotal movement on a shaft 186 extending between the side walls 98 of the boom extension, as shown in FIG. 14.

Returning to FIG. 19, the first intermediate link 180 is supported for pivotal movement on a shaft 188 extending between the side walls of the boom extension, and is also connected for pivotal movement on the drive link by a transverse pin 190 extending between the plates of the drive link 176 through the first intermediate link. As with the drive link 176 and driven link 178, the first intermediate link is formed by a pair of plates, both of the same shape, as shown in FIG. 13.

The plates of the first intermediate link 180 are spaced from one another by a distance slightly greater than the thickness of the second intermediate link 182, which is shaped like a dog bone as shown in FIG. 19, and includes a first end supported by a pin 192 extending between the plates of the first intermediate link 180 for pivotal movement relative to the first link. A second end of the link 182 is supported on a pin 194 extending between the plates of the driven link 178 for pivotal movement relative to the driven link.

Figure 23:
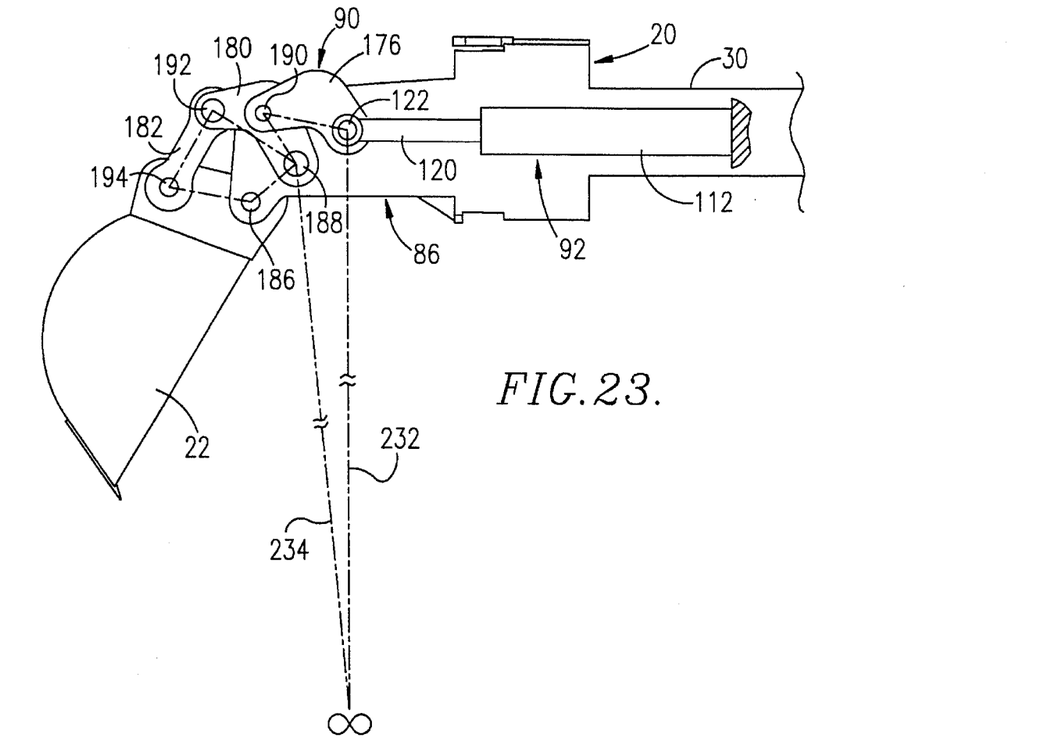
FIG. 23 is a schematic view of the linkage arrangement employed in the manipulator.
Figure 24:
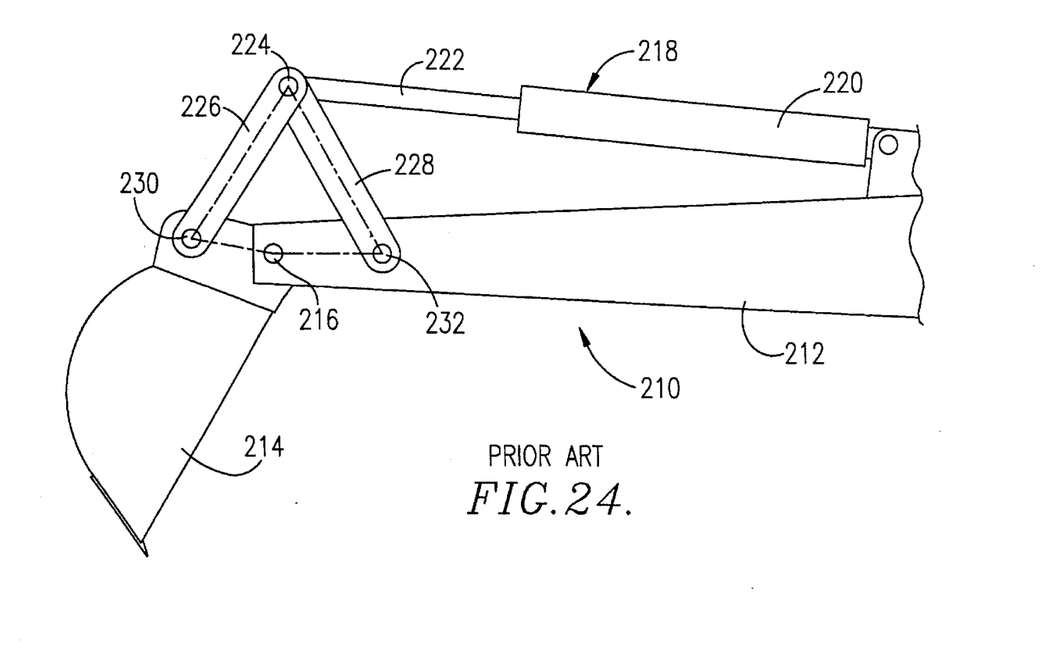
FIG. 24 is a schematic view of a linkage arrangement of a prior art backhoe.

The advantages of linkage arrangement 90 are evident from a comparison of conventional backhoe linkage as shown schematically in the prior art FIG. 24 as compared with the schematic representation of linkage structure 90 as depicted in FIG. 23. In a conventional backhoe 210, the outermost boom section 212 supports a bucket 214 on the outermost end thereof for pivoting about a horizontal axis 216. Piston and cylinder assembly 218 carried by the boom section 212 includes a cylinder 220 having an operating rod 222 pivotally coupled through a pin 224 which also interconnects links 226 and 228 respectively. The end of link 226 remote from pin 224 is pivotally connected to the bucket 214 by a pivot pin 230 while the end of link 228 remote from 224 is pivotally joined to boom section 212 a pin 232. Pins 230 and 232 are on opposite sides of the pivot pin axis 216.

In the operation of the backhoe 210, retraction and extension of cylinder rod 222 causes the bucket 214 to be pivoted about axis 216 through the intervening linkage 226, 228. Bucket 224 is therefore caused to rotate through provision of a four bar linkage made up of the links 226, 228, the boom section 212, and the bucket 214. As is also apparent from FIG. 24, the four bar linkage and the piston and cylinder assembly 218 project above the boom section 212 to a substantial extent, thus requiring that the hole being excavated with the bucket be of sufficient dimensions to accommodate not only the operating linkage, but also the hydraulic drive mechanism for the bucket.

This construction is also of a size and orientation that housing of the outer boom section 212 within an intermediate boom is impractical, and it is not possible to incorporate the bucket pivoting mechanism within the boom section, or within an axial projection of the cross sectional shape of the boom section.

In contrast therewith, the linkage arrangement 90 employed in the preferred embodiment of the present invention defines low profile mechanism capable of fitting within an axial projection of the cross sectional shape of outer boom 30 such that the outer boom may be mounted for telescopic receipt within the intermediate boom 28. By providing this construction, neither the linkage arrangement 90 nor the piston and cylinder assembly 92 interfere with extensible movement of the outer boom or require digging of an oversize hole merely to accommodate the linkage arrangement 226, 228 and piston and cylinder assembly 218.

Specifically, as shown in FIG. 23, a four bar linkage is defined in the preferred embodiment of the present invention by the intermediate links 180, 182, the bucket 22 and the body of the boom extension 86. This linkage is driven by a sliding crank defined by the drive link 176, the movement of which may be represented as a separate, independent four bar linkage including the drive link 176, the intermediate link 180, an imaginary line 232 extending in a direction transverse to the longitudinal axis of the piston and cylinder assembly 92 to infinity, and a line 234 intersecting line 232 at infinity and extending to shaft 188 of the first intermediate link 180. This dual four bar linkage permits the piston and cylinder assembly 92 to be mounted within the boom extension and the links to be located within an imaginary envelope defined by the axial projection of the cross section of the outer boom 30.

As a consequence, a hole may be dug in the ground using bucket 22 of significantly smaller transverse dimensions than with conventional backhoes. This is an important consideration particularly where opening of paved streets is required, or disruption of the property is to be minimized. Further, by locating the linkage arrangement 90 and piston and cylinder assembly 92 within the imaginary envelope, the outer boom 30 may be supported for telescopic receipt within the intermediate boom 28.

The coupler is illustrated in FIG. 14, and is provided on the driven link 178 on the linkage structure. The coupler includes the shaft 186 extending between and beyond the side walls of the body, a transverse hole 196 formed through the plates of the driven link 178 at an uppermost end of the link, and a pin 198, shown in FIG. 13, sized for receipt in the hole 196 and removable to permit replacement of the tool supported on the boom extension.

Returning again to FIG. 14, each tool constructed for use with the apparatus includes a pair of laterally spaced, upward opening hooks 200 sized for engaging each end of the shaft 186 on either side of each side wall 98, and a pair of upstanding lugs 202 provided with transverse holes 204, the lugs being oriented for alignment with the transverse hole 196 through the driven link when the hooks are engaged on the shaft so that the pin 198 may be threaded through both the driven link and the lugs to retain the tool on the link.

Additional tools may be used other than the excavation bucket. For example, as shown in FIG. 22, a hydraulic hammer 206 may be provided with suitable coupling components 200, 202 to permit attachment of the hammer to the driven link of the boom extension. Hydraulic lines 208 are connected between the tool and the hydraulic couplings provided on the outer boom to power the tool.

The hammer tool 206 may be provided with either a penetrating tip used for demolishing concrete or other surface materials during initial stages of an excavation, or a flat-bottomed compacting tip that may be used to compact soil during backfill of a completed excavation. Although not illustrated, the compacting tip may be provided with a scoop or blade provided on the side of the tool. By providing this construction, the tool may be manipulated to first scoop soil into the excavation, and thereafter be turned and oriented to compact the backfilled soil.

Of particular note is the fact that the piston and cylinder assembly 92 which is functional to effect pivoting movement of the bucket 22 through its range of motion as illustrated in FIGS. 19–21, is fully contained within the confines of the cross sectional envelope of the outer boom 30, in direct contrast to conventional tip articulation cylinders.

Furthermore, the linkage structure 90 is constructed and configured such that in all pivot positions of the bucket 22, as depicted for example in FIGS. 19–21, the components of the linkage do not project beyond an imaginary transversely polygonal projection of the outer casing 168 of manipulator 20 carried by outer boom 30. This is accomplished by the strategic location and lengths of the various links making up linkage structure 90. By virtue of this construction and arrangement of components, bucket 22 may be employed to excavate a hole in the ground of significantly smaller cross section with respect to its depth than would be the case with conventional backhoes where the cylinder and linkage construction would otherwise interfere with restricted cross sectional excavations.

During operation of the apparatus, e.g. in new construction work, or maintenance or repair of existing utility lines, the truck may be driven to the location of the construction or repair and parked adjacent the site to be worked. As shown in FIG. 3, the outriggers 16 are lowered via hydraulic power to support the truck, and an operator mans the control station 18 while other maintenance personnel prepare the surface to be excavated.

Any tools required to prepare the site, whether electrical, pneumatic or hydraulic, may be powered by the generator, compressor or hydraulic pump system provided on the truck so that no external power sources are necessary.

The operator at the control panel is able to pivot the panel relative to the truck to a position providing an optimum view of the area to be excavated, and this operator controls the boom and manipulator assemblies from the control station. Initially, the demolition tool is mounted on the manipulator assembly if it is necessary to demolish any concrete covering the excavation site. Thereafter, the demolition tool is replaced by the bucket 22, and excavation is carried out by lowering the booms to the ground and pivoting the bucket through a circular, scooping arc, as shown serially in FIGS. 10, 11 and 12.

Upon completing each scooping movement, the boom assembly is operated in a manner similar to a backhoe to allow soil from the site to be dumped aside. After the excavation is complete and the line is exposed, any repairs are carried out with the tools available on the truck, and again no outside tools or power sources are required.

Finally, the excavation is backfilled by attaching the demolition tool provided with the compactor tip and scoop, and moving soil back into the excavation while compacting the soil to prevent later settling.

Numerous advantages are achieved by employing a machine made in accordance with the present invention. For example, by providing an articulating base boom formed of two relatively movable sections, it is possible to park the truck adjacent a curb, as shown in FIG. 6, and to operate a tool at any desired location to the rear and, if desired, immediately adjacent the side of the vehicle without reorienting the truck to face directly away from the excavation. Thus, where repairs are to be made adjacent roadways or the like, it is possible to park the truck in a position least affecting traffic, and to carry out the excavation.

As shown in FIG. 5, the range of movement of the tool and boom assembly extends completely around the side of the truck adjacent the front end thereof, although the tool is preferably not used in this orientation since the operator is unable to see the tool without assistance.

Although the invention has been described with reference to the preferred embodiment illustrated in the attached drawing figures, it is noted that substitutions may be made and equivalents employed herein without departing from the scope of the invention as recited in claims.

Although a tool such as bucket 22 removably attached to outer boom 30, has been illustrated and described as one specific embodiment of the invention which has particular utility, it is appreciated that a device such as a boom jib may also be removably mounted on the outer boom 38. In this case, the jib may be maneuvered into a number different positions relative to the outer boom 30, and at the same time, the intermediate and outer booms may be articulated relatively to a desired extent. In this manner, the machine has various uses as a material handling unit for lifting objects, positioning electrical conductors, or other tasks performed by contractors and/or utility installation, maintenance and repair crews.

What is claimed is:

1. A mobile vehicle provided with a multiple purpose material handling and working apparatus for use with one or more tools, the apparatus comprising:

an articulated boom defining a longitudinal axis and including a free distal end;

a tool supporting boom extension supported on the free distal end of the articulated boom for rotation about an axis parallel to the longitudinal axis of the boom;

the boom extension including a body, a linkage structure movable between unpivoted and pivoted positions relative to the body, a coupling means for coupling each of the one or more tools to the linkage structure, and a linkage drive means mounted on and movable with the body for moving the linkage structure between unpivoted and pivoted positions, the linkage drive means including a cylinder-and-piston assembly supported on the body and extending beyond the body into the boom; and a rotary drive means supported on the boom for rotating the boom extension relative to the boom, the cylinder-and-piston assembly defining a central longitudinal axis about which the boom extension is rotated.

2. A multiple purpose material handling and working apparatus as recited in claim 1, wherein the boom includes a base boom section, an intermediate boom section attached to the base boom section for articulating movement relative to the base boom section, and an outer boom section telescopically supported in the intermediate boom section and extensible between retracted and extended positions relative to the intermediate boom section, the boom extension being supported on the outer boom section.

3. A multiple purpose material handling and working apparatus as recited in claim 1, wherein the rotary drive means includes a hydraulic motor having an output shaft that engages the cylinder-and-piston assembly to rotate the boom extension about the longitudinal axis of the cylinder-and-piston assembly.

4. A multiple purpose material handling and working apparatus as recited in claim 1, further comprising limit stop means for limiting the range of rotational movement of the boom extension to less than about 360°.

5. A multiple purpose material handling and working apparatus as recited in claim 1, wherein the cylinder-and-piston assembly includes an elongated cylinder fixed relative to the body of the boom extension and defining a longitudinal axis, and a piston that is movable relative to the cylinder;

the linkage drive means including a pair of opposed ways extending in a direction parallel to the longitudinal axis of the cylinder, and rollers supported for movement within the ways, the piston being provided with a transverse shaft connecting the piston to the rollers so that when the piston is moved relative to the cylinder, the piston is maintained collinear with the cylinder.

6. A multiple purpose material handling and working apparatus as recited in claim 5, wherein the linkage structure includes a drive link supported for pivotal movement on the transverse shaft of the piston, a driven link supported for pivotal movement on the body of the boom extension, a first intermediate link supported for pivotal movement on the body and on the drive link, and a second intermediate link connected for pivotal movement on both the first intermediate link and the driven link.

7. A mobile vehicle provided with a multiple purpose material handling and working apparatus comprising:

a plurality of tools, each including a pair of laterally spaced hooks and at least one upstanding lug that is spaced vertically from the hooks, the at least one lug including a transverse hole;

a boom defining a longitudinal axis and including a free distal end; and a tool supporting boom extension supported on the free distal end of the boom, the boom extension including a body, a linkage structure supported on the body and movable between unpivoted and pivoted positions relative to the body, a coupling means for coupling each of the one or more tools to the linkage structure, and a linkage drive means for driving the linkage structure between unpivoted and pivoted positions, the linkage structure including a drive link supported for pivotal movement relative to the linkage drive means, and a driven link supported for pivotal movement about a predetermined axis on the body, the coupling means including a shaft that is coaxial with the predetermined axis on the body, a transverse opening provided in the driven link, and a removable pin sized for receipt in the opening, wherein the hooks of each of the one or more tools are sized for receipt on the shaft to position the holes in the one or more lugs in alignment with the opening in the driven link so that the lugs may be pinned to the driven link.

8. A multiple purpose material handling and working apparatus as recited in claim 7, wherein the tools are selected from the group consisting of an earth excavation bucket, a hydraulic jackhammer, a hydraulic winch, and a hydraulic pipe threading tool.

9. A mobile vehicle provided with a multiple purpose material handling and working apparatus for use with one or more tools, the apparatus comprising:

an upstanding turret having a central vertical axis about which the turret is rotatable;

a base boom supported on the turret for articulating movement relative to the turret, the base boom including a proximal section supported on the turret for articulating movement relative to the turret about a first horizontal axis, and a distal section supported on the proximal section for pivotal movement relative to the proximal section about a vertical axis;

an intermediate boom attached to the distal section of the base boom for articulating movement relative to the base boom about a second horizontal axis;

an extensible outer boom telescopically supported within the intermediate boom and movable between retracted and extended positions relative to the intermediate boom, the outer boom defining a longitudinal axis and including a free distal end;

a tool supporting boom extension supported on the free distal end of the boom by a bearing assembly that permits the boom extension to rotate about an axis parallel to the longitudinal axis of the boom, the boom extension including a body, a first linkage structure supported on the body and movable between unpivoted and pivoted positions relative to the body, a coupling means for coupling each of the one or more tools to the first linkage structure, a linkage drive means for driving the first linkage structure between unpivoted and pivoted positions, and a rotary drive means for rotating the boom extension relative to the boom;

a second linkage structure connected between the base boom and the intermediate boom for articulating the intermediate boom between a first position substantially parallel to and nesting against the base boom, and a second position substantially collinear with and extending outward from the base boom; and a drive means for articulating the intermediate boom between the first and second positions, the second linkage structure and drive means being disposed externally of the intermediate boom to permit receipt of the extensible outer boom within the intermediate boom.

10. A mobile vehicle provided with a multiple purpose material handling and working apparatus for use with one or more tools, the apparatus comprising:

a base boom including a proximal section supported on the vehicle for articulating movement relative to the vehicle about a first horizontal axis, and a distal section supported on the proximal section for pivotal movement relative to the proximal section about a vertical axis;

an intermediate boom attached to the distal section of the base boom for articulating movement relative to the base boom about a second horizontal axis;

an extensible outer boom telescopically supported within the intermediate boom and movable between retracted and extended positions relative to the intermediate boom;

a linkage structure connected between the base boom and the intermediate boom for articulating the intermediate boom between a first position substantially parallel to and nesting against the base boom, and a second position substantially collinear with and extending outward from the base boom, the linkage structure including at least one drive link supported on one of the base and intermediate booms, and at least one driven link supported on the other of the base and intermediate booms and connected for pivotal movement on the drive link; and a drive means including at least one cylinder-and-piston assembly connected to the at least one drive link for operating the drive link and driven link to carry out articulation of the intermediate boom relative to the base boom, the linkage structure and drive means being disposed externally of the intermediate boom to permit receipt of the extensible outer boom within the intermediate boom.

11. A mobile vehicle provided with a multiple purpose material handling and working apparatus for use with one or more tools, the apparatus comprising:

an articulating boom defining a longitudinal axis and including a free distal end;

a tool supporting boom extension supported on the free distal end of the boom for rotation about an axis parallel to the longitudinal axis of the boom, the boom extension including a body, a linkage structure movable between unpivoted and pivoted positions relative to the body, a coupling means for coupling each of the one or more tools to the linkage structure, and a linkage drive means mounted on and movable with the body for moving the linkage structure between unpivoted and pivoted positions, the linkage drive means including a cylinder-and-piston assembly provided with a cylinder that is supported on the body and extends beyond the body into the boom;

a bearing means provided between the boom and the cylinder for supporting the cylinder, and the boom extension, for rotation about the longitudinal axis of the cylinder; and a rotary drive means supported on the boom for rotating the boom extension.

* * * * *